Jan. 16, 1951 L. DEVAUX 2,537,974

IMPULSE GENERATOR WITH FEELER AND DISPLACEABLE REGISTER MEMBERS

Filed Feb. 18, 1947 4 Sheets-Sheet 1

INVENTOR.
LUCIEN DEVAUX
BY
Robert Harding Jr.
ATTORNEY

INVENTOR.
LUCIEN DEVAUX
BY
Robert Harding Jr.
ATTORNEY

INVENTOR.
LUCIEN DEVAUX
BY
Robert Harding Jr.
ATTORNEY

Jan. 16, 1951

L. DEVAUX

IMPULSE GENERATOR WITH FEELER AND DISPLACEABLE REGISTER MEMBERS 2,537,974

Filed Feb. 18, 1947

4 Sheets-Sheet 4

INVENTOR.
LUCIEN DEVAUX
BY
Robert Harding Jr.
ATTORNEY

Patented Jan. 16, 1951 2,537,974

UNITED STATES PATENT OFFICE 2,537,974

IMPULSE GENERATOR WITH FEELER AND DISPLACEABLE REGISTER MEMBERS

Lucien Devaux, Paris, France, assignor to International Standard Electric Corporation, New York, N. Y., a corporation of Delaware Application February 18, 1947, Serial No. 729,280
In France September 8, 1939

Section 1, Public Law 690, August 8, 1946
Patent expires September 8, 1959

8 Claims. (Cl. 179—90.3)

The present invention relates to electric signalling equipment adapted for the transmission of digital impulses in a predetermined order, particularly for the selection of a subscriber in an automatic telephone network.

The customary dial selection of a subscriber's number involves a series of disadvantages which include, besides the manual effort of digit selection, the need for looking up numbers in the directory, or memorizing them, and the possibility of errors when a subscriber is in a hurry to establish a connection, as in the case of an emergency. These disadvantages are particularly marked where the subscribers of the network are identified by call numbers having six or seven digits, as is the case in all major cities having automatic telephone service. Various systems have been developed whereby a subscriber's dial may be replaced, or supplemented, by what is sometimes referred to as a pushbutton arrangement, such arrangement making it possible to call a desired party by the simple actuation of a key. The party is selected by name from a limited roster of stations which are frequently called by the particular subscriber or which it may be important to have available in an emergency, such as fire department, police, physician, and so on.

In the systems heretofore devised, complications arise as soon as the subscriber wants to add a new name to his partially completed list or to replace a number that has become obsolete. The resetting of the mechanism is generally an intricate affair, frequently involving the use of special tools for cutting cams and requiring the services of a skilled mechanic. For this reason the subscriber will often be delayed in making the necessary changes, being thus deprived of the full benefit of his equipment.

It is an object of the present invention to provide push-button selection means in which a number may be conveniently pre-selected by any subscriber, even one not used to dial operation.

It is another object of the invention to provide push-button selection means in which a preselected number may be permanently displayed, and in which the pre-setting mechanism is readily accessible to the subscriber.

A further object of the invention is to provide impulse generating equipment of the push-button type wherein the time interval between digits of a number is substantially constant, regardless of the number of impulses in the preceding digit.

A still further object of the invention is to provide, in a system of the type described, a convenient arrangement wherein a dial may be combined with a plurality of pre-selector units, each of the latter units being individually accessible for purposes of readjustment.

According to the invention, there is provided a plurality of pre-selector units or registers each of which may consist of a small box containing a number of slides, there being at least as many slides as there are digits in the call number of any desired subscriber. Any one of these registers may be selectively aligned with the impulse generating mechanism, the latter comprising a feeler member which determines, step by step, the position of each slide and causes the generator to send out a train of digital impulses corresponding to that position. The mechanism may comprise a spring-driven shaft a single revolution of which corresponds to transmission of the complete number, and speed regulating means may be provided to maintain a constant angular velocity throughout the shaft's rotation; optionally, means may be provided to accelerate the shaft between digits, so as to reduce the delay necessary between successive impulse trains and to make this delay substantially constant regardless of the number of impulses in the preceding digit. The registers may be arrayed in a circle around a dial position, and the arrangement may be such as to prevent the switching of register units while the mechanism is in the process of impulse transmission.

The invention will be more clearly understood from the following detailed description thereof, reference being had to the accompanying drawing in which.

Figures 1, 2, 3:
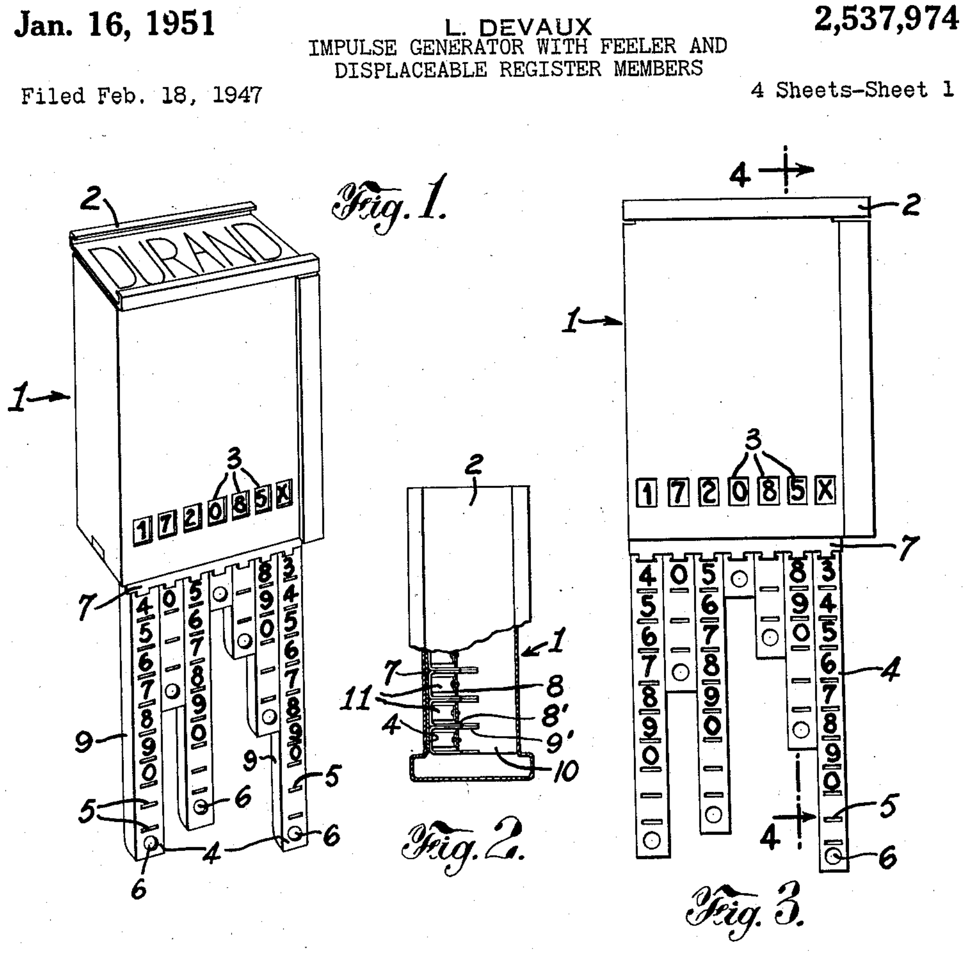
Figs. 1–4 show a register unit, Fig. 1 being a perspective view, Fig. 2 a plan view partly in section, Fig. 3 a front view, and Fig. 4 a sectional elevation taken on line 4—4 of Fig. 3.
Figure 4:
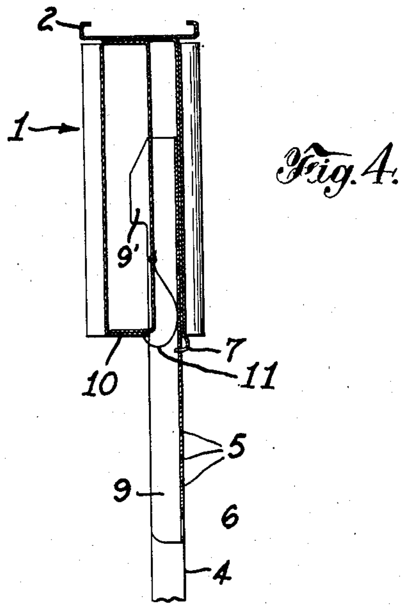
Figure 5:
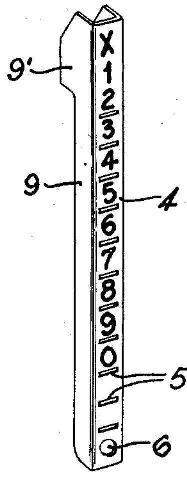
Fig. 5 is a perspective view of a slide.

The embodiment shown in the drawing is given merely by way of example and is one of several possible realizations of the invention; its detailed construction and mode of operation will now be described.

*The register unit (Figs. 1–5)*

The individual register unit shown in the drawing comprises a frame 1 of swaged sheet metal, forming the sides of a four-sided box which is topped by a cover 2. The cover may conveniently bear the name of the subscriber to whose number the register has been pre-set, this number appearing in the windows 3 for ready reference. A plurality of slides 4, in the present case seven, project from the frame 1, this particular unit being adapted for the registration of call numbers up to seven digits. The slides 4 are provided with a plurality of transverse slits 5 and a round hole 6, the latter serving for the insertion of a pin or other appropriate tool to facilitate a movement of the slide in vertical direction. The slits 5 may be selectively engaged by a tongue member 7, a guide plate 8 having suitable vertical channels 8′ to accommodate the side portions 9 of the trough-shaped slide 4. Flared extensions 9′ of the sides 9 rest against a strip 10 when the slide is in its lowermost position, thus preventing the latter from dropping out of the box. Small springs 11 are secured at one end to the strip 10 and serve to urge the slides toward the front of frame 1 so as to keep the tongues 7 in engagement with the slits 5.

There are eleven slits provided in each slide, corresponding to eleven definite positions in which any of the digits 1 through 0, arranged in the conventional order, or a non-digital character such as "X" may appear in the associated window 3. The eleven characters "X", 1, 2, 3 . . . 9, 0 are arranged on the slides in such a manner that the non-digital character will appear in the fully drawn-out position of the slide, as shown at the extreme right in Figs. 1 and 3. As the slide is raised step by step, to which end it is pressed inward against the action of spring 11 to release the slits 5 from the tongue 7, the numerals 1, 2, 3 and so on successively appear in the window until, in the fully elevated position, a zero is displayed (see central slide in Figs. 1 and 3). Thus it will be seen that the character displayed in any window corresponds to the number of steps that particular slide had been raised from its lowermost position, 0 corresponding to ten and "X" equalling naught.

*The impulse generating mechanism (Fig. 6)*

Figure 6:
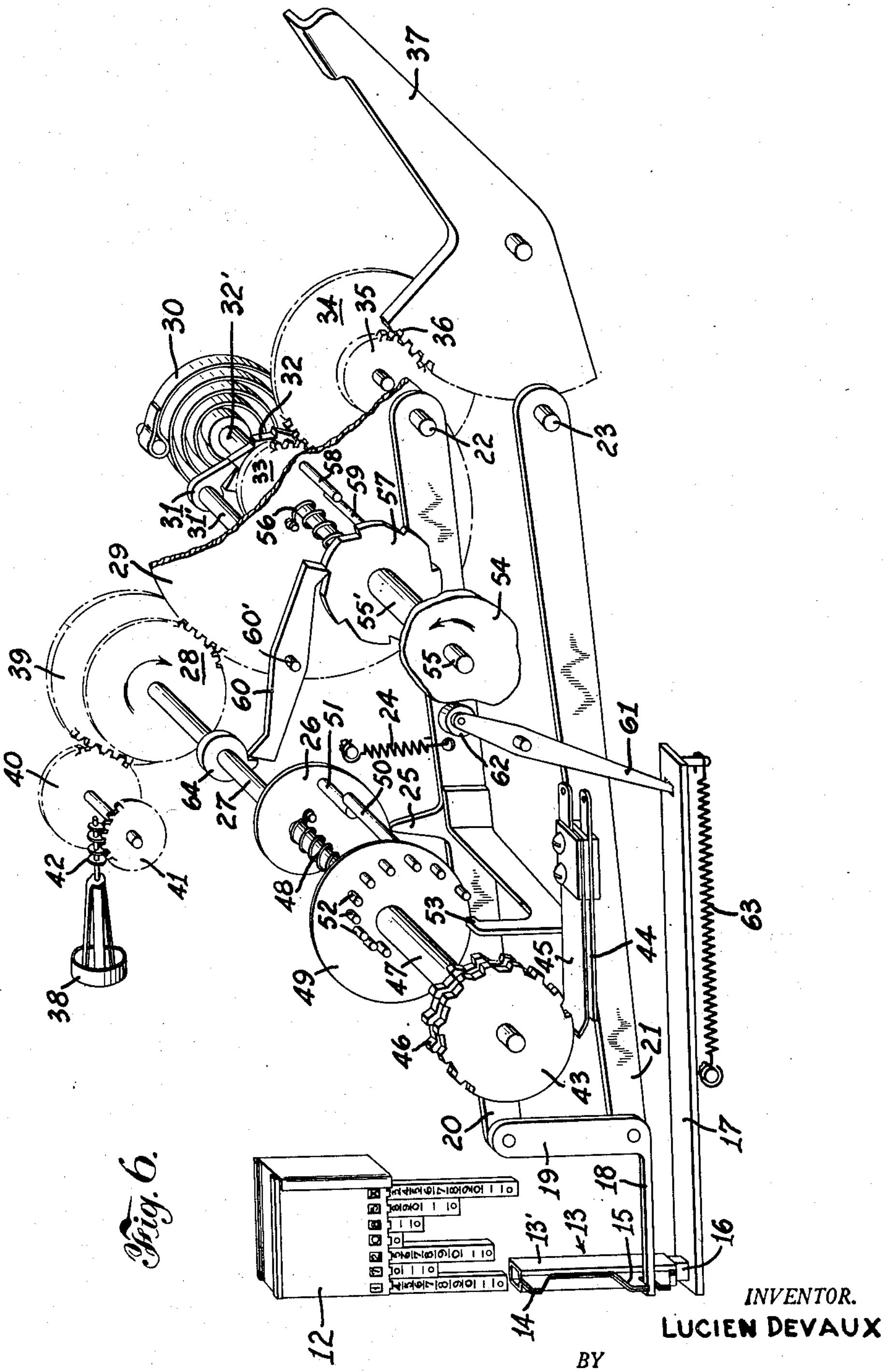
Fig. 6 is a perspective view of the impulse generating mechanism.

The mechanism which translates the preselected number into digital impulses for transmission over a telephone line is illustrated in Fig. 6, wherein the register unit described above is generally indicated by reference numeral 12. In accordance with the invention, there is provided a feeler member, generally designated as 13, which may be successively aligned with the several slides projecting from a register and which, after each such alignment, will ascend to a point where a finger abuts against the bottom of the respective slide. The feeler 13, comprising a light square tube 13′ provided with a finger 14, is positioned so that there will be practically no clearance between its finger 14 and an aligned slide when the latter is fully drawn out; therefore the feeler, in order to reach any slide, must advance by a distance exactly proportional to the number of steps by which the slide had been raised in the pre-selection of the call number. The tube 13′ is further provided with a fork 15 and slides on a square guide member 16, the latter being carried by a link 17 which is free to travel in a horizontal direction. Vertical displacement of the feeler proceeds under the control of the horizontal arm 18 of a bell crank lever which engages the fork 15, the vertical arm 19 of this crank being pivotally connected to the two parallel levers 20 and 21. These two levers are pivoted on studs 22, 23 respectively, and a parallelogram is formed by the bell crank arm 19, the levers 20 and 21, and the vertical line 22—23. This insures a purely vertical motion of the bell crank arm 18, resulting in uniform vertical displacement of the feeler member 13, 14 irrespective of its instantaneous horizontal position.

The upward movement of the feeler 13 in determining the position of the respective slides proceeds under the force of a spring 24 and is controlled by a cam follower 25 which coacts with a cam 26 mounted on an arbor 27. When the equipment is at rest, that is in the condition shown in the drawing, the feeler 13 will be in its lowermost position since the cam follower 25 engages a high point on the cam 26. The corresponding low point is preferably displaced by 240° against the direction of rotation (see arrow), which means that the upward movement of the feeler will take place over two-thirds of a cycle and the downward movement over the remaining third. Hence the descent of the feeler 13 will be twice as fast as its ascent.

Rotary motion, in the direction indicated, is imparted to the arbor 27 by means of a gear 28 meshing with a larger gear 29, the ratio of transmission between the two gears being seven to one. A complete revolution of the gear 29 will therefore coincide with seven revolutions of the cam 26 and, as the result of the horizontal displacement subsequently to be described, the finger 14 will successively contact the seven slides projecting from the register 12. The gear 29 is actuated by a spring 30 through the intermediary of a pawl 31 and ratchet wheel 32, and a sleeve 32′ connects the spring 30 and the ratchet wheel 32 with a gear 33 which is part of a gear train 33, 34, 35, 36, the latter being a sector gear integral with an arm 37.

The lever arm 37, serving to rewind the spring 30, represents the "push button" or key through which the transmission of signal impulses may be initiated. In the illustrated rest position, the arm 37 abuts against a stop (not shown) which limits its upward movement and thereby determines the normal position of gears 28, 29 and cam 26. Another stop, not shown, limits the downward movement of this arm to a distance which corresponds to a rotation of the sleeve 32′ by 360°, permitting a single revolution of the gear 29 in the restoring movement.

The rotative speed of the arbor 27 may be controlled by a centrifugal regulator 38, of well-known design, by means of gears 39, 40 and a worm drive 41, 42.

It will be appreciated that the length of the arbor 27 and the spacing of its associated parts has been exaggerated in the drawing, for the sake of greater clarity. This arbor further carries a toothed cam 43 cooperating with two normally closed contact springs 44, 45, assumed to be connected to a transmission line in series with a source of power, not shown. There is further provided a second toothed cam 46, having a surface similar to that of cam 43, spring 45 being arranged to break the contact with spring 44 upon engagement of aligned indentations on cams 43 and 46. The latter cam is connected through a sleeve 47, carried on arbor 27, with a disc 49 fixed to a light coil spring 48, the other end of that spring being attached to the cam 26.

As the cam 43 as well as the cam 26 are fixed to the arbor 27, the relative position between cams 43 and 46 will depend on the relative position between the cam 26 and the disc 49. Two abutments 50 and 51, respectively provided on members 49 and 26, determine the normal relative position thereof as shown in the drawing, and the spring 48 tends to maintain this position unaltered during the rotation of the arbor.

The cams 43 and 46 have ten indentations arranged so that the contact between springs 44 and 45 will be interrupted once for each step that a slide has been raised, as determined by the distance which the feeler 13 has to travel in order to reach this particular slide. The unbroken surface portion of the cams subtends an arc of 120°, so that no impulses will be sent during the return movement of the feeler. The cam 46 is designed to prevent the generation of further impulses within a cycle from the moment when the finger 14 makes contact with a respective slide, and the manner in which this is done will now be described.

The disc 49 is provided with ten stop members or pins 52 which are distributed over the face thereof in the form of a spiral. A projection 53, carried by the lever 20, is in position to intercept the respective stops 52 in the consecutive positions of the feeler 13, thereby preventing further rotation of the disc 49, sleeve 47 and cam 46 and tensioning the spring 48. The angular displacement of the stops 52 corresponds to that of the indentations on cams 43 and 46, but the arrangement is such that a raised portion on the surface of cam 46 will be presented to the contact spring 45 whenever the disc 49 is arrested through engagement of a stop 52 by projection 53.

The projection 53 is normally aligned with the outermost of the stops 52 which only has to go through an angle of approximately 12 degrees in order to be intercepted by the former. Hence, if the slide momentarily aligned with the feeler 13 is in the fully drawn-out position, corresponding to the character "X," the projection 53 will remain immobilized and the cams 43 and 46 will be thrown out of alignment before the spring 45 can engage the first indentation thereof; thus no impulses will be sent during this particular cycle. Similarly, if the feeler 13 is allowed to ascend a distance corresponding to, say, 5 numerical steps, the projection 53 will be moved up such distance as will permit the first five stop members 52 to pass unhindered, causing the generation of five signal impulses, while interception of the sixth pin arrests the cam 46 in such a position that additional impulses may not be generated. When a slide is in its zero position, like the central slide shown on the register 12, no pin will be engaged and the ten impulses afforded by the ten aligned indentations on cams 43 and 46 will be subsequently transmitted. The transmission of ten impulses for a zero digit corresponds to the customary practice in automatic telephone systems.

The spring 48 is sufficiently weak not to interfere with the operation of the mechanism under the control of the powerful clockspring 30. At a certain point during the last third of a cycle, the projection 53 will be disengaged from whatever pin 52 it had intercepted and return to its illustrated position. At the same time the coil spring 48 will be free to realign the cam 26 with the disc 49 in a position where the two abutments 50 and 51 are again in contact, and the assembly carried by the arbor 27 returns to normal in expectation of the next digit.

The horizontal movement of the feeler 13, for the successive engagement of the different slides, is under the control of a cam 54 which is freely rotatable on a shaft 55 fixed to the gear 29. By means of a sleeve 55′ the cam 54 is connected with a seven-toothed ratchet 57, a spring 56 tending to keep the ratchet 57 aligned with the gear 29. Two abutments 58 and 59, respectively secured to the members 57 and 29, determine the normal relative position of these two members in an arrangement similar to that of abutments 50 and 51 previously described. A dog 60, pivoted on a stud 60′, engages with one end the ratchet 57 and has its other end aligned with an escapement cam 64 carried on the arbor 27. The link 17, carrying the feeler 13, is actuated by a pivoted lever 61 bearing a follower roller 62 which cooperates with the cam 54. A spring 63 serves to maintain the roller 62 in contact with the surface of cam 54 and to restore the feeler 13 to its extreme left position at the end of the signal transmission. This part of the mechanism operates in the following manner:

When the arm 37 is depressed, at the start of a signal transmission, the sleeve 32′ and its associated elements revolve but the shaft 55, carrying the gear 29 and the sleeve 55′, is not moved. (This may be insured by providing a ratchet and a pawl, not shown, arranged so as to prevent a rotation of the shaft 55 in reverse direction.) As the ratchet 33 starts its return movement in a counter-clockwise direction, the pawl 31 causes rotation of the gear 29 since the stud 31′ on which it is pivoted is secured to that gear. When the shaft 55 has rotated through an angle of about 51 degrees, corresponding to one revolution of the arbor 27, the escapement cam 64 causes the momentary release of the seven-toothed ratchet 57 from the dog 60 which had heretofore prevented the members 54, 57 from following the gear 29. The tension of spring 56 now causes the ratchet wheel to advance by one tooth at which juncture the dog 60 is again in position to prevent further rotation.

As the ratchet 57 advances step by step, at the end of each revolution of arbor 27, cam 54 is rotated in the same discontinuous fashion and causes the intermittent displacement of link 17 to the right, timed to coincide with the return of the feeler 13 to its fully depressed position. After rotating through 360°, the cam 54 presents an abrupt drop to the roller 62, permitting the practically instantaneous return of the link 17 to its normal position.

*The interval equalizing mechanism (Fig. 7)*

It has been assumed that the mechanism shown in Fig. 6 operates at substantially constant speed. The transmission of ten digital impulses was indicated to correspond to an angle of rotation of 240 degrees, the duration of a complete cycle being therefore the equivalent of the time needed for fifteen impulses which may be expressed as 15 units of time. It follows that the interval between successive digits will vary between 5 units, when the preceding digit is zero, and 14 units, when the preceding digit is one. Since the transmission line is idle during these intervals, the time necessary for the establishment of a connection could be substantially reduced for the average call if it were possible to limit these intervals to their minimum duration of, say, five units.

Figure 7:
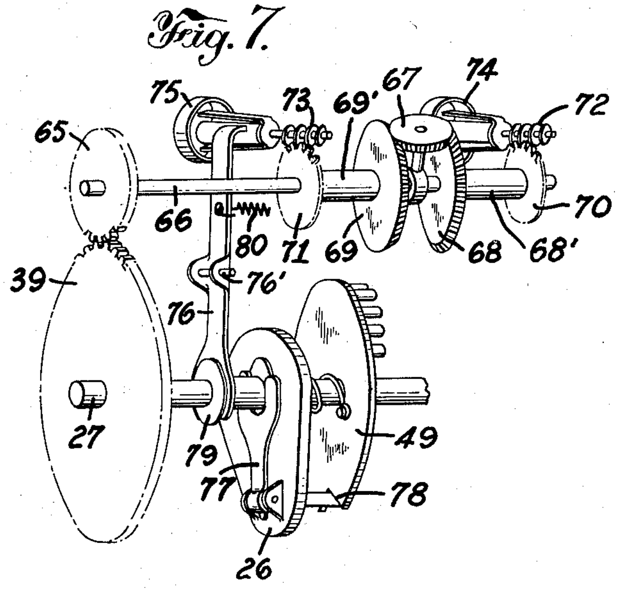
Fig. 7 is a partial modification of the mechanism shown in Fig. 6.

This can be accomplished by substituing the mechanism shown in Fig. 7 for the centrifugal regulator 38 and its associated driving members 40, 41 and 42. Only the parts necessary for the understanding of the modification have been shown in Fig. 7, the others being assumed to correspond to those shown in Fig. 6.

The principle of this mechanism consists in the provision of two independent centrifugal regulators respectively connected with the planetary gears of a differential gear, one of these regulators being normally inactivated so that the controlled shaft rotates only at half the speed of the gear associated with the other regulator. When the first regulator comes into play, which is after a digit comprising less than the maximum number of impulses has been sent, the shaft is permitted to rotate at a materially higher rate, assumed in the present case to be three times its normal speed. This arrangement, as will presently become clear, reduces the time interval between impulses to substantially the equivalent of five units regardless of the number of impulses in the preceding digit.

The gear 39 fixed to the arbor 27 meshes with a gear 65 which drives a shaft 66. The miter gear 67 of a differential gear revolves with the shaft 66 and meshes with the planetary gears 68 and 69 freely rotatable thereon, and the two last-mentioned gears are connected by sleeves 68' and 69' with two tangent wheels 70, 71 respectively, the latter cooperating with the worms 72, 73 associated with the centrifugal regulators 74 and 75. The locking of regulator 75 is effected by means of a lever 76, pivoted at 76', which is controlled by a bell crank 77 pivoted on cam 26 and having one extremity normally engaged by a notch 78 provided in the periphery of disc 49. The other end of the bell crank 77 straddles a sleeve 79 which, on rightward displacement thereof, is adapted to move the lever 76 out of locking position against the force of a restoring spring 80.

The notch 78 is shaped so that the end of bell crank 77 will be cammed out of its engaged position whenever the disc 49 and the cam 26 are relatively displaced. The forked end of the bell crank is thereupon moved to the right, actuating the lever 76 and freeing the regulator 75 for rotation.

It has been shown that the disc 49 is angularly displaced relative to the cam 26 whenever a digit containing less than ten impulses has been transmitted, to be restored only after a corresponding point on the descending portion of the cycle has been reached. That is, if the digit five has been sent, the two members will remain displaced during half the ascending portion and half the descending portion of the cycle, or, in accordance with assumptions previously made, for a time interval corresponding to 7½ units. If, now, the operation of the regulator 75 cuts this time to one-third, or 2½ units, to which must be added the 2½ units from the descending portion of the cycle, the result will be a total interval between digits corresponding to five units which is the minimum interval for which the system has been designed. A simple calculation will verify the fact that the same result is obtained for any other digit.

Figure 8:
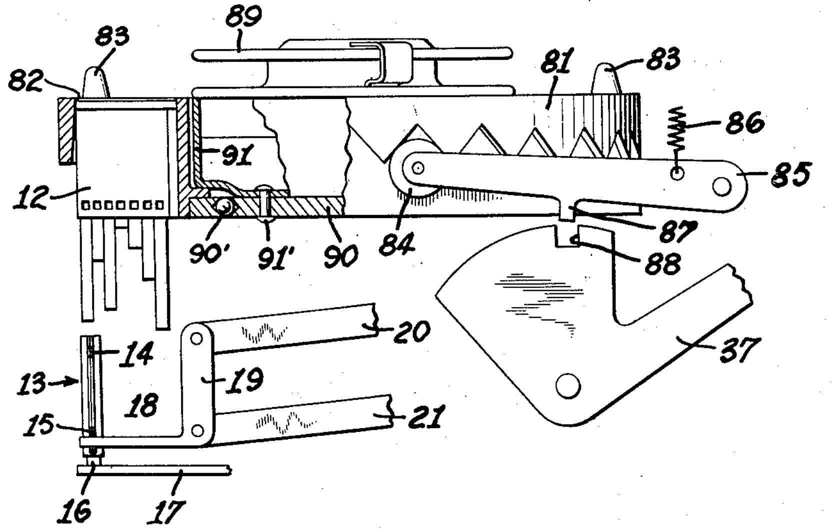
Fig. 8 is an elevation and Fig. 9 a plan view of an array of register units combined with a dial.

*The register and dial assembly (Figs. 8 and 9)*

In practice, any reasonable number of individual register units may be provided in a single apparatus in such manner that they may be selectively positioned for cooperation with the associated impulse generating mechanism. Preferably, the arrangement should be such that a subscriber may use the same general part of his apparatus for push-button or dial operation which also serves to simplify the electric circuit connections. A possible arrangement illustrated in the drawing comprises a circular crown member 81 having a plurality of equally spaced, radially oriented apertures 82 in which the units 12 may be inserted. The crown member 81 is freely rotatable on its base, by means of one or more knobs 83, to align the desired register unit with the feeler member of the mechanism.

A roller 84 is carried by a pivoted lever 85 and acts as a rider on the serrate portion of crown 81, a spring 86 serving to force that roller into positive engagement of a selected indentation and thereby to lock the selected unit in a centered position. Preferably, means may be provided to prevent a switching of register units while the mechanism is in the process of transmitting impulses, which may take the form of a projection 87 on lever 85 positioned for normal cooperation with a notch 88 provided in an extended portion of the arm 37. When the arm is in off-normal position, that is when impulses are being transmitted, the projection 87 prevents the lever 85 from being depressed and the crown member 81 must therefore remain in its instantaneous position. Selection of a subscriber may therefore only take place when the equipment is at rest.

A conventional telephone dial 89 may be carried on a platform 90 arranged concentrically with the crown member 81, the latter being rotatable relative to the former by means of ball bearings 90'. The dial may be enclosed by a housing 91 secured to the platform 90, say, by rivets 91'. Where the apparatus is to be used as an addition to a pre-existing dial telephone installation, the housing 91 may simply be covered by a plate (not shown), possibly of ornamental design.

Figure 10:
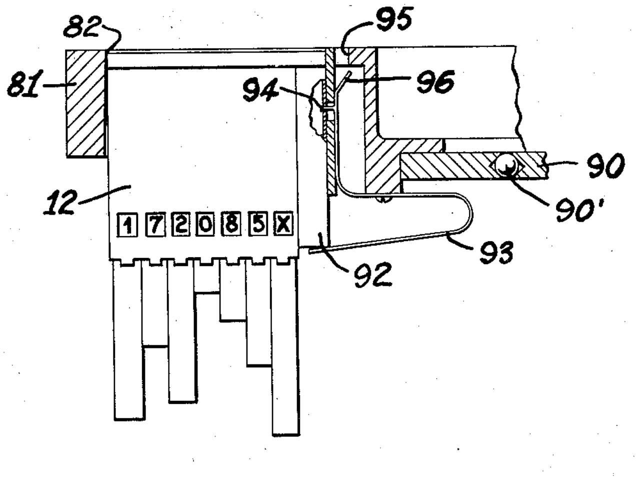
Fig. 10 is an elevation and Fig. 11 a plan view, both partly in section, of the locking mechanism for a register unit.
Figure 11:
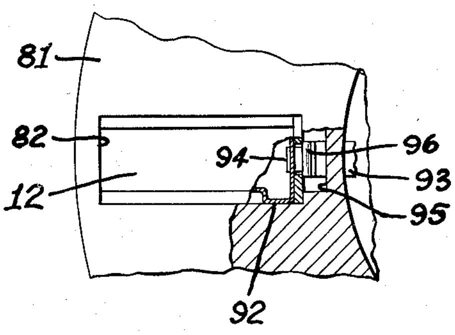

*Insertion of the register unit (Figs. 10 and 11)*

Figure 9:
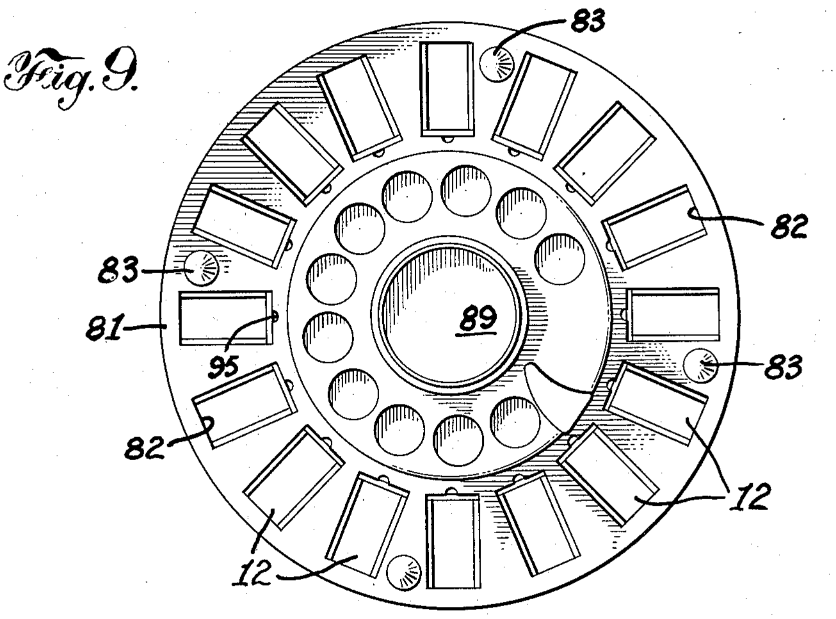

The register units 12 are provided with an enlarged portion 92 which may be slid down a corresponding channel forming part of the apertures 82 shown in Fig. 9. Having been positioned flush with the upper surface of crown member 81, the portion 92 presses upon a curved extremity of a spring 93 while a prong 94 integral with the other end of that spring engages an aligned aperture in the frame of the register. Removal of the register unit may be accomplished by inserting a small rod or pin into the opening 95 so as to engage the bent end 96 of the spring 93. The prong 94 will thereupon be withdrawn and the tension of the curved portion of the spring will partially eject the register 12 which may then be easily removed by hand.

As many modifications and adaptations of the invention as hereinabove disclosed will undoubtedly occur to those skilled in the art, such departures should be considered fully within the spirit and scope of the invention as defined in the appended claims.

What is claimed is:

1. An impulse producing mechanism for cooperation with an associated register unit having a plurality of selectively displaceable slide members, comprising a feeler member associated with said register unit, means linked with said feeler member for displacing said feeler member in a first direction whereby said feeler member may be aligned step by step with the successive slide members, means linked with said feeler member for displacing said feeler member in a second direction whenever the same is aligned with a respective slide member, and means responsive to the movement of said feeler member for producing a plurality of electrical impulses in accordance with the positions of said slide members.

2. An impulse producing mechanism for cooperation with an associated register unit having a plurality of selectively displaceable slides, comprising a first cam shaft rotatable upon actuation of a release member, a second cam shaft coupled to said first shaft so as to perform a number of revolutions in the course of a single revolution of said first shaft, said number of revolutions corresponding to the number of slides provided on said register unit, a feeler associated with said register unit and normally aligned with one of said slides, means under the control of said second shaft for displacing said feeler in the longitudinal direction of said slides, means under the control of said first shaft for displacing said feeler in a direction transverse to said slides, means for producing electrical signal impulses, and means responsive to the longitudinal movements of said feeler for varying the number of said impulses generated during a single revolution of said second shaft in accordance with the position of a slide respectively aligned with said feeler during the said revolution of the second shaft.

3. An impulse producing mechanism for cooperation with an associated register unit having a plurality of selectively displaceable slides, comprising a shaft operable upon actuation of a release member to perform a number of consecutive revolutions corresponding to the number of said slides, a feeler associated with said register unit and controlled by said shaft for being successively brought into contact with respective ones of said slides in the course of said consecutive revolutions, contact means for producing electrical signal impulses, a cam member rotatable with said shaft and selectively positioned thereon to actuate said contact means by engaging the same up to a predetermined number of times during each of said consecutive revolutions, and a cam member rotatable with said shaft being operatively positioned thereon to prevent actuation of said contact means during that part of a revolution when said feeler is in contact with one of said slides.

4. An impulse producing mechanism as set forth in claim 3, comprising means for controlling the speed of said shaft throughout said consecutive revolutions.

5. An impulse producing mechanism as set forth in claim 3, comprising means for maintaining the speed of said shaft substantially constant during that part of a revolution when said feeler is not in contact with any of said slides and means for increasing said speed during that part of a revolution when said feeler is in contact with one of said slides.

6. A system for producing trains of electrical impulses corresponding to the respective positions of a plurality of digit-selection members, comprising a shaft, a feeler member associated with said digit-selection members coupled to said shaft and controlled by said shaft so as to make successive contact with said digit selection members, and means for keeping substantially constant the time interval between consecutive impulse trains, said means including two independent speed regulators coupled to said shaft through the intermediary of a differential gear, means for keeping one of said regulators normally inactive, and means for releasing said normally inactive regulator when said feeler is in contact with one of said digit selection members.

7. An automatic telephone apparatus comprising a dial frame, a housing rotatable around said frame, said housing having a plurality of radially oriented apertures for receiving a number of register units, signal producing mechanism mounted in said dial frame and adapted to be responsive to the positions of a plurality of digit-selection members provided in each of said units, means for selectively aligning a selected one of said register units with said signal producing mechanism comprising a spring urged lever mounted on said dial frame, a roller mounted on said lever, said housing having a serrated circumferential portion adapted to engage said roller in a plurality of positions each corresponding to an aperture containing a register unit, means for rotating said housing and means cooperating with said spring urged lever for locking said housing in a desired position.

8. An automatic electric signal transmitter comprising a plurality of slides arranged side by side and longitudinally movable in directions parallel to each other in the same plane into a plurality of positions, an element connected to each slide and movable therewith, each of said plurality of positions of said slides corresponding to a different signal, a feeler member associated with said slides, a guide linked to said feeler member and extending transversely to the direction of movement of the slides for moving said member into a series of positions each in alignment with one of said slides, means linked with said feeler member for moving the member when in each position into contact with said element on the aligned slide, means for producing pulse signals and means controlled by said feeler member for controlling the number of pulses produced in successive signals in accordance with the movement of said member.

LUCIEN DEVAUX.

REFERENCES CITED

The following references are of record in the file of this patent:

UNITED STATES PATENTS

| Number | Name | Date |
|---|---|---|
| 757,030 | Faller | Apr. 12, 1904 |
| 1,478,419 | Bailey | Dec. 25, 1923 |
| 1,891,633 | Batdorf | Dec. 20, 1932 |
| 2,253,650 | Richard | Aug. 26, 1941 |
| 2,386,486 | Mallina | Oct. 9, 1945 |

FOREIGN PATENTS

| Number | Country | Date |
|---|---|---|
| 113,837 | Austria | July 25, 1929 |
| 499,834 | Germany | June 13, 1930 |
| 862,931 | France | Mar. 19, 1941 |